United States Patent [19]

McBride

[11] Patent Number: 6,092,022

[45] Date of Patent: *Jul. 18, 2000

[54] OPTIMAL SURVEY MAP PROJECTION SYSTEM

[75] Inventor: Kenneth W. McBride, Los Altos, Calif.

[73] Assignee: Trimble Navigation, Sunnyvale, Calif.

[ * ] Notice: This patent is subject to a terminal disclaimer.

[21] Appl. No.: 08/808,078

[22] Filed: Feb. 28, 1997

[51] Int. Cl.[7] .............................. G06C 7/78; G01C 21/00
[52] U.S. Cl. .................... 701/207; 701/213; 342/357.12; 342/357.01
[58] Field of Search .................................. 701/200, 213, 701/215, 207, 208; 342/357, 457, 352, 357.01, 357.12, 386, 463; 340/990

[56] References Cited

U.S. PATENT DOCUMENTS

| | | | |
|---|---|---|---|
| 4,175,328 | 11/1979 | Kellner | 33/1 A |
| 4,413,907 | 11/1983 | Lane | 356/139.05 |
| 4,791,572 | 12/1988 | Green et al. . | |
| 4,841,460 | 6/1989 | Dewar et al. . | |
| 4,870,422 | 9/1989 | Counselman . | |
| 4,891,761 | 1/1990 | Gray et al. . | |
| 4,899,161 | 2/1990 | Morin et al. . | |
| 4,954,833 | 9/1990 | Evans et al. . | |
| 4,982,504 | 1/1991 | Söderberg et al. . | |
| 5,014,206 | 5/1991 | Scribner et al. | 364/449 |
| 5,030,957 | 7/1991 | Evans . | |
| 5,166,789 | 11/1992 | Myrick | 348/144 |
| 5,175,575 | 12/1992 | Gersuk | 353/94 |
| 5,204,731 | 4/1993 | Tanaka et al. . | |
| 5,208,763 | 5/1993 | Hong et al. | 364/551.02 |
| 5,214,757 | 5/1993 | Mauney et al. . | |
| 5,233,357 | 8/1993 | Ingensand et al. | 342/352 |
| 5,261,029 | 11/1993 | Abi-Ezzi et al. | 395/123 |
| 5,280,569 | 1/1994 | Tsujido | 395/127 |
| 5,311,195 | 5/1994 | Mathis et al. | 342/357 |
| 5,321,797 | 6/1994 | Morton . | |
| 5,343,415 | 8/1994 | Itoh et al. | 364/725 |
| 5,345,086 | 9/1994 | Bertram . | |
| 5,357,600 | 10/1994 | Shirman et al. | 395/133 |
| 5,467,290 | 11/1995 | Darland et al. . | |
| 5,583,494 | 12/1996 | Mizutani et al. | 340/995 |
| 5,596,500 | 1/1997 | Sprague et al. | 364/449.7 |
| 5,614,913 | 3/1997 | Nichols et al. | 342/357 |
| 5,644,318 | 7/1997 | Janky et al. | 342/357 |
| 5,774,826 | 6/1998 | McBride | 701/207 |
| 5,841,353 | 11/1998 | Chilsholm et al. | 701/213 |

OTHER PUBLICATIONS

Dirk J. Struik, *Differential Geometry*, Addison Wesley, Cambridge, Mass., 1950, pp. 66–73.

W.A Granville, P.F. Smith and W.R. Longley, *Elements of Calculus*, Ginn and Co., Boston, Mass., 1946, pp. 219–221.

John P. Snyder, "Map Projections—A Working Manual" U.S. Geological Survey Prof. Paper No. 1395, U.S. Govt. Print. Office, 1987, pp. 38–47 and 68–75.

*Primary Examiner*—Jacques H. Louis-Jacques
*Attorney, Agent, or Firm*—John Schipper

[57] ABSTRACT

Methods for providing a representation of location coordinates for a collection of survey points with enhanced accuracy. An obliquely oriented cylindrical surface, rather than a tangent plane, is determined and used as the projection surface at or near a survey base point, with the angular orientation and radius of the cylinder being chosen to optimize the accuracy of the projection. A scale factor that corrects for distances of locations projected onto the cylindrical surface is optionally determined and applied. A three-dimensional transformation of survey location coordinates, optimized to provide a best fit for a selected set of fiducial survey locations, is determined that provides a correspondence between a globally determined height coordinate and a locally determined elevation coordinate.

16 Claims, 5 Drawing Sheets

OPTIMAL SURVEY MAP PROJECTION SYSTEM

Many of the approaches disclosed in these patents utilize projections of locations onto a selected planar surface that is tangent to an ellipsoid at a selected survey base point, to determine the "horizontal" location coordinates. Where a planar surface is used for the projection, the error associated with projection of any survey location increases quickly and nonlinearly with horizontal distance from the survey base point.

What is needed is a method of projection (1) for which an associated algorithm can be easily applied or programmed for use in a microprocessor, (2) that is easy to understand conceptually, (3) that treats all survey locations in a consistent manner, and (4) that minimizes or reduces the location coordinate error associated with most or all of the survey locations used in a survey.

SUMMARY OF THE INVENTION

These needs are met by the invention, which relies upon an oblique Mercator projection of the survey location coordinates onto a selected obliquely oriented cylinder that is approximately tangent to a "local ellipsoid" used to locally model the Earth's surface for purposes of the survey. The point of cylinder tangency, the cylinder radius and the cylinder angular orientation are chosen based upon the local ellipsoid parameters and upon the (unprojected) location coordinates for the survey. In one approach, the point of cylinder tangency and the cylinder angular orientation are chosen based upon the location coordinates of three easily determined survey locations, namely, a near-centroid of the collection of survey locations and two additional distinct survey locations that are farthest from each other. The cylinder radius used in this approach is based upon the radius of curvature extrema of the local ellipsoid at the near-centroid location.

The procedure is summarized as follows in one embodiment: (1) set up a selected ellipsoid surface E that defines a first coordinate system; use a user-prescribed ellipsoid, if this is given; otherwise, use the WGS84 or another selected ellipsoid as the default ellipsoid; (2) determine the local coordinates for each survey point or location, using the ellipsoid E; (3) determine the survey centroid $(x^\wedge, y^\wedge, z^\wedge)$ of the survey locations; (4) determine a survey location (x0, y0,z0) ("near-centroid") that is closest to the survey centroid; (5) determine two survey data points Pm1: (xm1,ym1, zm1) and Pm2: (xm2,ym2,zm2) that are farthest from each other among all survey locations; (6) form a vector or line that connects the points (xm1,ym1,zm1) and (xm2,ym2, zm2), and translate this vector to determine a parallel vector that passes through the near-centroid location (x0,y0,z0); (7) determine an obliquely oriented Mercator cylinder whose generator (a circle in 3-space) is tangent to the ellipsoid surface E at the near-centroid (x0,y0,z0) and whose cylinder axis is perpendicular to the vector; (8) project each survey location onto the Mercator cylindrical surface and determine two-dimensional northing and easting coordinates (N,E) for the survey location using the projection onto this surface; (9) determine and apply a multiplicative scale factor that is required to exactly reproduce the distance between the points Pm1 and Pm2, or another selected set of points under the cylindrical projection (optional); (10) apply an n1-parameter coordinate transformation T1 (optional) to determine a "best fit" mapping of the first Cartesian coordinate system onto a second Cartesian coordinate system that preserves known coordinates for selected fiducial survey locations and that provides a correspondence between height H in the first coordinate system and elevation EL in the second coordinate system; and (11) apply an n2-parameter coordinate transformation T2 (optional) to determine a "best fit" mapping of local coordinates (latitude, longitude, height) onto processed local coordinates (latitude, longitude, elevation).

DESCRIPTION OF BEST MODES OF THE INVENTION

Figure 1:
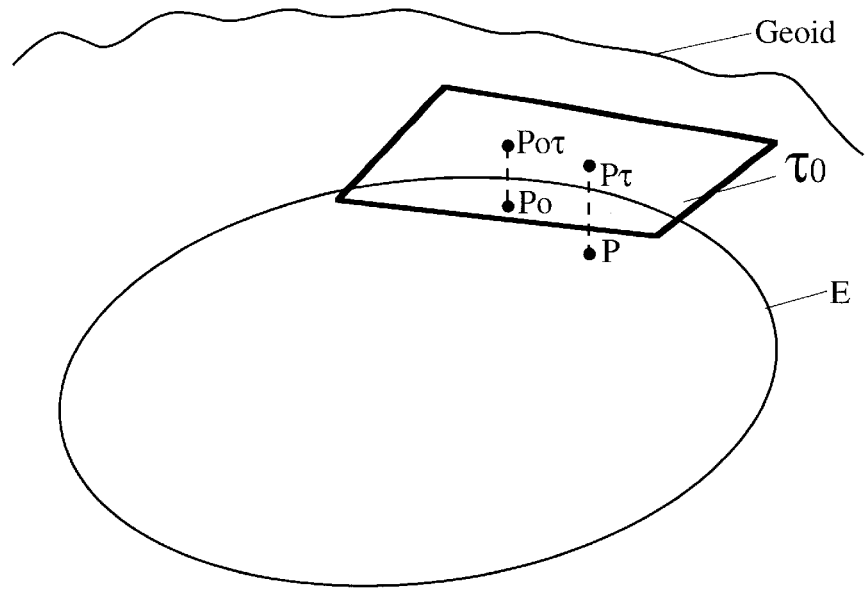
FIG. 1 illustrates a representative projection method used in the prior art.

In a conventional survey projection, as illustrated in FIG. 1, three-dimensional survey coordinates (xu,yu,zu) are obtained in a universal coordinate system, such as WGS84, NAD27 or NAD83, using an appropriate ellipsoid surface E to model the Earth's surface. A survey base point τ0 on the ellipsoid surface E is then selected and a projection plane π0 is then determined, which is tangent to E at the point P0, to approximately represent a projection of an arbitrary survey location onto E. Each surveyed location P, having survey coordinates (xu,yu,zu) with respect to the ellipsoid E, is then projected perpendicularly onto the projection plane π0 to determine N (northing) and E (easting) coordinates in the plane π0. A third coordinate EL for the survey point P, representing an elevation coordinate, is determined using the distance of the point P from a geoid surface G used to model important local geophysical features. Determination of the elevation coordinate EL requires calibration or calculation of distance between the ellipsoid surface E and the geoid surface G for a choice of latitude and longitude coordinates for a survey location.

A surveyed point P near or on the ellipsoid surface E that is close to the survey base point P0, within a distance of about ten kilometers (km), will have an acceptably small associated projection error, preferably no more than 1–2 centimeters (cm). Surveyed points P that are located at greater distances from the survey base point P0, such as 30–60 km or more, may have unacceptably large projection errors, of the order of several cm or more. This projection error arises, in part, from the nonlinearly increasing distance between a survey point P and its projection point Pτ on the projection plane π0, as the distance between the projection point Pτ and the survey base point projection P0τ increases in the projection plane π0. The projection surface π0 used for the projection in a conventional survey projection is usually a plane or some other suitably "flat" surface, in order to provide a corresponding two-dimensional or map-like representation that is intuitive and that is easily interpreted.

In the innovative approach adopted here, this projection surface need not be planar, or "flat" when viewed in all directions from the survey base point P0. The projection surface is chosen to be cylindrical, a form of developable surface that is discussed by D. J. Struik in *Differential*

*Geometry*, Addison Wesley, Cambridge, 1950, pp. 66–73 A developable, which surface has a surface generator that is a straight line when viewed in one direction and that is a straight line or a curved line when viewed in a transverse direction. A plane, such as the projection plane τ0, is a developable surface. Another developable surface is a cylinder whose cross-sectional shape may be a circle or a more general shape, preferably convex.

Figure 2:
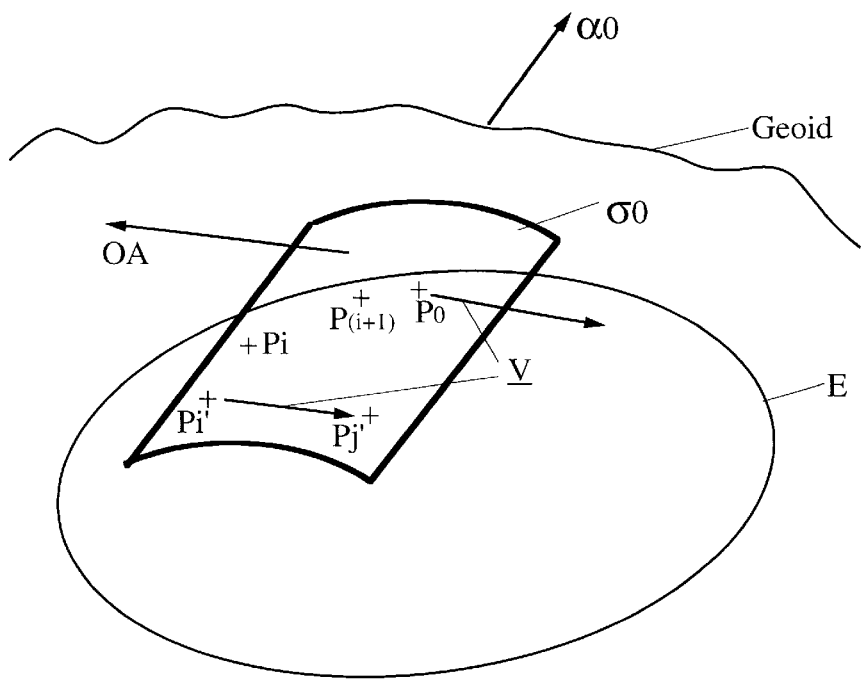
FIG. 2 illustrates determination of a line that defines a generator of an oblique Mercator cylinder according to the invention.

FIG. 2 illustrates the invention in one embodiment, where the projection plane τ0 of FIG. 1 is replaced by a selected section of an obliquely oriented circular cylindrical surface σ0. The cylindrical surface σ0 preferably includes a survey base point P0 that is also on the ellipsoid surface E, and the tangent plane τ0 for E at P0 and the tangent plane for σ0 at P0 are the same. A survey location Pi (i=1, 2, . . . , M; M≧2) is projected perpendicularly onto the cylindrical surface σ0, rather than onto the tangent plane τ0, and northing and easting coordinates Ni and Ei corresponding to the survey location Pi are determined relative to the survey base point P0. An elevation coordinate ELi for the survey location Pi is determined by the (signed) distance of the survey location Pi from a chosen geoid surface G. The (signed) local difference Δh in height between the ellipsoid surface E and the geoid surface G depends upon the latitude and longitude coordinates (lat,lon) of a survey location and is often provided as a grid with interpolatable differences Δh.

The location of the survey base point P0 may be chosen to be a survey location (a "near-centroid") that is closest to the centroid location ($N_{cen}, E_{cen}, EL_{cen}$) for the collection of survey locations {Pi}, where the coordinates of the centroid location are determined by $$N_{cen} = \sum_{i=1}^{M} Ni/M, \quad (1A)$$

$$E_{cen} = \sum_{i=1}^{M} Ei/M, \quad (1B)$$

$$EL_{cen} = \sum_{i=1}^{M} ELi/M, \quad (1C)$$

where (Ni,Ei,ELi) are the (N,E,EL) coordinates of the survey location Pi. Alternatively and preferably, the elevation coordinates ELi for the survey locations Pi are ignored or are not computed at this point, and the survey base point P0 is taken to be the survey location projected onto the cylindrical surface σ0, having northing and easting coordinates (Nb,Eb), that is closest to the location on σ0 with northing and easting coordinates ($N_{cen}, E_{cen}$). Alternatively, the survey base point P0 can be chosen to be any other convenient point, such as a selected survey location Pi.

The direction of the axis α0 of the oblique cylinder σ0 is preferably chosen so that the cylinder surface is, in some sense, as close as possible to the collection {Pi} (i=1, 2, . . . , N; N≧2) of survey points for which a representation in terms of the location coordinates (N,E,EL) is to be provided. If, as is often the case, the collection of survey points {Pi} is approximately an elongated oval with an oval axis OA, as illustrated in FIG. 2, the direction of the cylinder axis α0 is preferably chosen to be approximately perpendicular to the direction of the oval axis OA.

Let d(Pi,Pj) denote the distance between the survey locations Pi and Pj, computed using the survey location coordinates (xi,yi,zi) and (xj,yj,zj) for these respective locations.

Select two survey locations Pi' and Pj' from the collection {Pi} that satisfy the criterion $$d(Pi',Pj')=\max_{1 \leq i<j \leq N} d(Pi,Pj). \quad (2)$$

The two survey location Pi' and Pj' are separated by the maximum distance between any pair of survey locations. The choice of the pair (Pi',Pj') is not necessarily unique, but one is assured that at least one such pair (Pi',Pj') of locations can be found that satisfies Eq. (2) from among the N(N−1)/2 pairs of survey locations. Now construct a vector V=V(Pi', Pj') that extends from the location Pi' to the location Pj' (or from Pj' to Pi'). The cylindrical surface σ0 is constructed so that (1) the cylinder axis α0 is perpendicular to the direction of the vector V, (2) the circumferential direction of the cylindrical surface σ0 is parallel to the vector V at the survey base point P0, and (3) the radius of curvature C(σ0;P0) of the cylindrical surface σ0 in the circumferential direction at the survey base point P0 is equal to the radius of curvature C(E;P0) of the ellipsoid surface E at P0 in the direction of the vector V. For a right circular cylindrical surface σ0 having a cylindrical radius r0, the radius of curvature C0 of the cylindrical surface in the circumferential direction is $C0=(r0)^{-1}$.

In an Earth-centered, Earth-fixed (ECEF) coordinate system, the ellipsoid surface E is described by the equation $$(x/a)^2+(y/b)^2+(z/c)^2=1, \quad (3)$$

where x, y and z are Cartesian coordinates in the ECEF system and a, b and c are selected positive lengths representing the lengths of the three axes of the ellipsoid. In many instances the ellipsoid E is chosen to be a oblate spheroid with a=b>c. This last constraint may be imposed but is not required here.

Let the survey base point P0 have the Cartesian coordinates (x0,y0,z0), and let the vector V have the vector components ($v_x, v_y, v_z$) in this coordinate system. A line L0 that is parallel to the vector V and that passes through the survey base point P0 would have a parametric representation as $$x=x0+v_x s, \quad (4A)$$

$$y=y0+v_y s, \quad (4B)$$

$$z=z0+v_z s, \quad (4C)$$

where s is an arbitrary real number. The slope m of the projection of the vector V onto a local xy-plane at P0 is determined by $$v_y/v_x=m. \quad (5)$$

In a neighborhood of the survey base point P0, a curve Σ lying on the ellipsoid E that is parallel to the vector V at P0 and that passes through the survey base point P0 will have a representation near the point P0 in the form $$z(x)=(\pm)c\{1-(x/a)^2-(m(x-x0)+y0)^2/b^2\}^{1/2}, \quad (6)$$

where the ± sign arises from use of the square root operation in connection with Eq. (3). A representation in a similar form, with z expressed as a function of the coordinate y, is easily obtained by analogy, if desired. From W. A. Granville, P. F. Smith and W. R. Longley, *Elements of Calculus*, Ginn and Co., Boston, 1946, pp. 219–221, the curvature of the curve Σ at the base survey point P0 is determined to be $$C(\Sigma; P0) = (d^2z/dx^2)/\{1 + (dz/dx)^2\}^{3/2}, \quad (7)$$
$$= (\pm)c'\{-(1/a^2 + m^2/b^2)\{1 - (x/a)^2 -$$
$$(m(x - x0) + y0)^2/b^2\} -$$
$$(x/a^2 + m(m(x - x0) + y0)/b^2)^2\}/\{\{1 -$$
$$(x/a)^2 - (m(x - x0) + y0)^2/b^2 + c^2(x/a^2 +$$
$$m(m(x - x0) + y0)/b^2)^2\}(x = x0)$$
$$= (\pm)c\{-(1/a^2 + m^2/b^2)\{1 - (x0/a)^2 -$$
$$(y0/b)^2\} - (x0/a^2 + my0/b^2)^2\}/$$
$$\{\{1 - (x0/a)^2 - (y0/b)^2 +$$
$$c^2(x0/a^2 + my0/b^2)^2$$

An appropriate radius r0 for the oblique cylindrical surface σ0 is then $$r0' = 1/C(\Sigma; P0) \quad (8)$$

With this choice of cylinder position, cylinder orientation and cylinder radius r0, the circumferential direction of the cylindrical surface σ0 is oriented so that the curved surface of the surface σ0 in the circumferential direction (direction of the vector V) at P0 approximately matches a curve on the ellipsoid surface E in the direction of the vector V at P0.

The cylinder and associated cylindrical surface σ0 are constructed as follows. From Eq. (6), the tangent plane σ0 to the ellipsoid surface E at (x0,y0,z0) is described by the equation $$A(x-x0) + B(y-y0) + C(z-z0) = 0 \quad (9)$$
$$A = x0/a^2, \quad (10)$$
$$B = y0/b^2, \quad (11)$$
$$C = z0/c^2. \quad (12)$$

A cylindrical surface σ1, centered at (y1,z1), having a radius r0 and having a cylinder axis parallel to the x-axis is described by the equation $$(y-y1)^2 + (z-z1)^2 = r0^2 \quad (13)$$

The cylindrical surface σ1 is now subjected to a coordinate transformation given by a rotation by an azimuthal angle φ and a rotation by a polar angle θ, implemented by $$\begin{bmatrix} x' \\ y' \\ z' \end{bmatrix} = \begin{bmatrix} \cos\theta & 0 & -\sin\theta \\ 0 & 1 & 0 \\ \sin\theta & 0 & \cos\theta \end{bmatrix} \begin{bmatrix} \cos\phi & \sin\phi & 0 \\ -\sin\phi & \cos\phi & 0 \\ 0 & 0 & 1 \end{bmatrix} \begin{bmatrix} x \\ y \\ z \end{bmatrix}. \quad (14)$$

Under this coordinate transformation, the cylindrical surface σ1 becomes a transformed cylindrical surface σ1 described by the equation $$x^2(1 - \cos^2\phi\cos^2\theta) + y^2(1 - \sin^2\phi\cos^2\theta) + \quad (15)$$
$$z^2\cos^2\theta - 2xy\sin\phi\cos\phi\cos^2\theta + 2xz\cos\phi\sin\theta\cos\theta +$$
$$2yz\sin\phi\sin\theta\cos\theta - 2y1(-x\sin\phi + y\cos\phi) -$$
$$2z1(x\cos\phi\sin\theta + y\sin\phi\sin\theta + z\cos\theta) + y1^2 + z1^2 = r0^2.$$

The transformed cylindrical surface σ1, which is to coincide with the cylindrical surface σ0, has a tangent plane at a location with coordinates (x0,y0,z0) that is also described by $$A1 = x0(1 - \cos^2\theta\cos^2\phi) - y0\sin\phi\cos\phi\cos^2\theta + \quad (17)$$
$$z0\cos\phi\sin\theta\cos\theta + y1\sin\phi - z1\sin\theta\cos\phi = A,$$

$$B1 = x0\sin\phi\cos\phi\cos^2\theta + y0(1 - \sin^2\phi\cos^2\theta) + \quad (18)$$
$$z0\sin\phi\sin\theta\cos\theta + y1\cos\phi - z1\sin\phi\sin\theta = B,$$

$$C1 = x0\cos\phi\sin\theta\cos\theta + y0\sin\phi\sin\theta\cos\theta + z0\cos^2\theta - z1\cos\theta = C. \quad (19)$$

Equations (17), (18) and (19) are used to determine transformation parameters y1, z1, φ and θ that are suitable to reproduce the equalities in Eqs. (17)–(19). The resulting transformed cylindrical surface σ1, defined by Eq. (15), becomes the desired cylindrical surface σ0.

Figure 3:
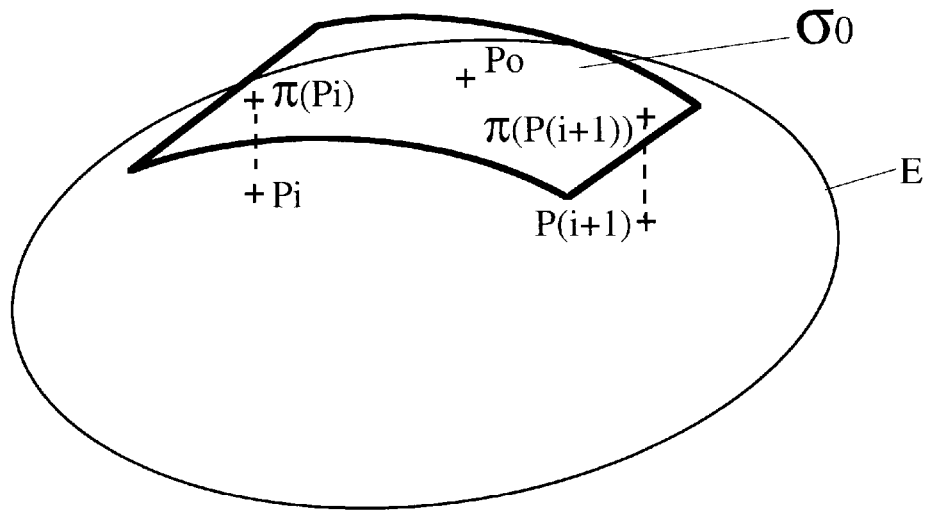
FIG. 3 illustrates a projection method implemented according to the invention.

Each survey location Pi is now projected, preferably perpendicularly, onto the cylindrical surface σ0, producing a projected location π(Pi) on the surface σ0 with corresponding northing and easting coordinates Ni and Ei, as illustrated in FIG. 3. Given a survey location with coordinates (x2,y2,z2), at least one point with coordinates (x",y",z") can be found on the cylindrical surface σ0 defined by Eq. (15) such that the distance from the location (x2,y2,z2) to the location (x",y",z") is minimized; that is $$d((x2,y2,z2), (x",y",z")) = \text{minimum} ((x",y",z") \in \sigma 0). \quad (20)$$

The location coordinates (x",y",z") are unique, except where the survey location (x2,y2,z2) lies on the cylinder axis; this situation is unlikely, because it would require that the survey location lie near the center of the Earth. The (unique) solution of Eq. (20) can be found using standard linear programming techniques.

Approximate location coordinates (x''',y''',z''') of a projected location on the surface σ0, corresponding to the survey location coordinates (x2,y2,z2), can be found in other ways as well. For example, the survey location with coordinates (x2,y2,z2) may be projected onto the surface σ0 using a vector U that is perpendicular to the ellipsoidal surface E and that passes through the survey location (x2,y2,z2). The nearest intersection of the vector U with the surface σ0 defines a corresponding location with coordinates (x''',y''',z'''). A tangent plane to the ellipsoidal surface E at the point (x"",y"",z"") has the equation $$x""(x-x"")/a^2 + y""(y-y"")/b^2 + z""(z-z"")/c^2 = 0, \quad (21)$$

$$(x""/a)^2 + (y""/b)^2 + (z""/c)^2 = 1, \quad (22)$$

and the vector U, normal to E, that passes through (x2,y2,z2) has a parametric representation $$x = x2 + (x""/a^2)s, \quad (23)$$
$$y = y2 + (y""/b^2)s, \quad (24)$$
$$z = z2 + (z""/c^2)s, \quad (25)$$

where s is an arbitrary real number. Using Eq. (15) to define the cylindrical surface σ0, the (smallest magnitude) parameter value, s=s''', for which Eq. (15) is satisfied is determined by solving a quadratic equation in the parameter s. The coordinates (x''',y''',z''') of the projection point on the surface s0 then become $$x'''=x2+(x''''/a^2)s''', \quad (26)$$

$$y'''=y2+(y''''/b^2)s''', \quad (27)$$

$$z'''=z2+(z''''/c^2)s''', \quad (28)$$

This provides a reasonably accurate approximation for the exact coordinates (x",y",z") of the projection of the survey location (x2,y2,z2) onto the surface σ0. Other suitable methods for approximating the projection of (x2,y2,z2) onto the surface σ0 can also be used here.

Thus, given a survey location P with coordinates (x2,y2,z2), the projection π(P) of this location on the cylindrical surface σ0 is determinable. This projection π(P) has coordinates (x",y",z"), which are easily converted to northing and easting coordinates (N,E) for that survey location relative to the cylindrical surface σ0.

In this projection operation, the distance d(Pi,Pj) between any two survey locations Pi and Pj is not formally preserved; that is, the distances d(Pi,Pj) and d(π(Pi),π(Pj)) are not necessarily the same for any pair (Pi,Pj) of survey locations. These distances may be approximately preserved by choosing a particular pair of survey locations, such as the maximum-distance pair (Pi',Pj') determined in connection with Eq. (2), and determining a scale factor $$F=d(Pi',Pj')/d(\pi(Pi'),\pi(Pj')). \quad (29)$$

In a first approach, all distances d(π(Pi),π(Pj)) for any pair of projected locations on the surface of the cylinder σ0 are then multiplied by the scale factor F. This is equivalent to expanding (or contracting) the surface of the cylindrical surface σ0 in all directions by the scale factor F, which expansion preserves angles.

In a second approach, the cylindrical surface σ0, having radius r0, is replaced by another cylindrical surface σ0' passing through the survey base point P0 that has the same orientation as the cylindrical surface σ0 but has a radius $$r0'=Fr0. \quad (30)$$

In another approach, a suitable scale factor F can be determined by an average $$F = 2\sum_{i=2}^{N}\sum_{j=1}^{i-1} d(Pi, Pj)/d(\pi(Pi), \pi(Pj))/N(N-1), \quad (31)$$

of the scale factors computed for all distinct pairs of survey locations, and this scale factor F can be applied as in the preceding discussion.

Alternatively, the scale factor F, however computed, can be applied to coordinate values computed in a first direction on the cylindrical surface σ0, such as parallel to the vector V, while coordinate values computed in a second perpendicular direction on the cylindrical surface σ0 are left unchanged. This approach does not preserve angles but may have other advantages.

Projection of points in three-dimensional space onto an obliquely oriented cylindrical surface, as illustrated in FIG. 3, is often referred to as an oblique Mercator projection. Projection onto a cylindrical surface, and more particularly projection onto an oblique Mercator cylindrical surface, is discussed by John P. Snyder in *Map Projections—A Working Manual*, U.S. Geological Survey Professional Paper No. 1395, U.S. Government Printing Office, 1987, pp. 38–47 and 67–75, the information from which is incorporated by reference herein.

After a scale factor F is (optionally) determined and applied, the northing and easting coordinates (Ni,Ei) for each survey location Pi are determined with reference to a perpendicular projection π(Pi) of the location Pi onto the cylindrical surface σ0. The northing and easting coordinates Ni and Ei of the projection π(Pi) are determined in the cylindrical surface σ0, with reference to the location of the survey base point P0, where π(P0)=P0. An elevation coordinate ELi for the survey location Pi is determined using the distance between the survey location Pi and the geoid surface G, or another selected reference surface.

Figure 4:
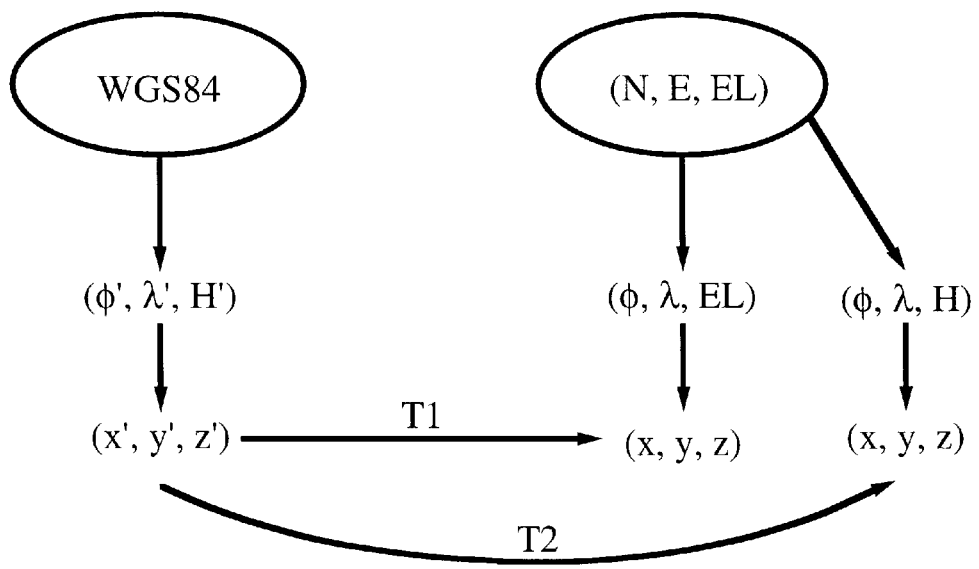
FIG. 4 illustrates schematically a coordinate transformation between two three-dimensional coordinate systems.

FIG. 4 illustrates an optional coordinate transformation T1 of the location coordinates (φ',λ',H') used in a WGS84 coordinate system, with corresponding Cartesian coordinates (x',y',z'), onto a local coordinate system having northing, easting and elevation coordinates (N,E,EL), having corresponding location coordinates (φ,λ,EL) and having corresponding Cartesian coordinates (x,y,z). The angles φ and λ represent longitude and (signed) latitude, and H is the height above or below a reference surface, preferably the ellipsoid surface E. The transformation T1 is preferably implemented by an n1-parameter transformation of the coordinate system (x',y',z') onto the local coordinate system (x,y,z), namely, $$\begin{bmatrix} x \\ y \\ z \end{bmatrix} = \begin{bmatrix} kx & 0 & 0 \\ 0 & ky & 0 \\ 0 & 0 & kz \end{bmatrix} R3(\theta12)R2(\theta13)R1(\theta23) \begin{bmatrix} x'+\Delta x \\ y'+\Delta y \\ z'+\Delta z \end{bmatrix}, \quad (32)$$

$$R3(\theta12) = \begin{bmatrix} \cos\theta12 & \sin\theta12 & 0 \\ -\sin\theta12 & \cos\theta12 & 0 \\ 0 & 0 & 1 \end{bmatrix}, \quad (33)$$

$$R2(\theta13) = \begin{bmatrix} \cos\theta13 & 0 & \sin\theta13 \\ 0 & 1 & 0 \\ -\sin\theta13 & 0 & \cos\theta13 \end{bmatrix}, \quad (34)$$

$$R1(\theta23) = \begin{bmatrix} 1 & 0 & 0 \\ 0 & \cos\theta23 & \sin\theta23 \\ 0 & -\sin\theta23 & \cos\theta23 \end{bmatrix}. \quad (35)$$

Here, kx, ky and kz are scale factors, θ12, θ13 and θ23 are independently chosen angles of rotation about the indicated coordinate axes, and Δx, Δy and Δz are independently chosen translation distances. If the three scale factors kx, ky and kz are regarded as independently selectable, the transformation T1 is a 9-parameter transformation. If the constraint kx=ky is imposed, T1 is an 8-parameter transformation. If the constraint kx=ky=kz is imposed, T1 is a 7-parameter transformation. More generally, the transformation T1 may have a number n1 of parameters between n1=5 and n1=12, as discussed in a co-pending patent application, U.S. Ser. No. 08/476,844 now U.S. Pat. No. 5,774,826), entitled "Optimization Of Survey Coordinate Transformations" and assigned to the same assignee as this application. The transformation T1 allows determination of a correspondence between the height coordinate H of a survey location, determined with reference to the ellipsoid surface E, and the elevation coordinate EL for that survey location, determined with reference to the geoid surface G.

A plurality of fiducial survey locations with accurately known Cartesian location coordinates (X'k,Y'k,Z'k) (k=1, 2, . . . , K;K≧2) is now selected by the user. The n1-parameter transformation T1 is applied to a location coordinate triple (x',y',z') in the WGS84 coordinate system, as illustrated in FIG. 4, to produce a local coordinate triple $$(x,y,z)=T1(x',y',z')=(T1(x'),T1(y'),T1(z')). \quad (36)$$

The n1 independently selectable parameters for the transformation T1 are chosen to minimize an error $\epsilon 1$ that is defined by $$\varepsilon 1 = \sum_{k=1}^{K} w_k \{(X'k - T1(x'k))^2 + (Y'k - T1(y'k))^2 + (Z'k - T1(z'k))^2\}, \quad (37)$$

where the coefficients $w_k$ are selected non-negative weights to the fiducial survey coordinate triples. In particular, one can choose all weights $w_k$ to be the same positive value. Optimum choices of the n1 parameters for T1 can be determined by iteration, beginning with an initial selected set of values for the parameters kx, ky, kz, $\theta 12$, $\theta 13$, $\theta 23$, $\Delta x$, $\Delta y$ and $\Delta z$. Alternatively, one can compute partial derivatives of the error $\epsilon 1$ with respect to each of the n1 parameters in Eq. (37) and use the n1 resulting equations to determine the appropriate optimum values for these parameters.

The n1-parameter transformation shown in Eqs. (32)–(35), with the particular order $R3(\theta 12)R2(\theta 13)R1(\theta 23)$ for the rotation matrices, is one of many such rotation matrices that can be used here. More generally, the overall rotation matrix may be $Ra(\theta bc)Rd(\theta ef)Rg(\theta hi)$, where the axis for the rotation matrix $Rd(\theta ef)$ differs from the axis for the rotation matrix $Ra(\theta bc)$ and also differs from the axis for the rotation matrix $Rg(\theta hi)$, and the rotation axes for the rotation matrices $Ra(\theta bc)$ and $Rg(\theta hi)$ may be the same or may be different from each other. For example, the overall rotation matrix in Eq. (32) may be replaced by the overall rotation matrix $R3(\theta 12)R2(\theta 13)R3(\theta 12')$, where the third independent rotation angle is now $\theta 12\theta$. Also, one or more of the rotation angles may be zero.

FIG. 4 also illustrates a second coordinate transformation T2, having n2 parameters, where n2 also lies in the range 5–12. The transformation T2 is determined after the transformation T1 establishes a correspondence between height H' and elevation EL. The transformation T2 determines a correspondence between the (lat',lon',height') coordinates in the original (WGS84) system and the (lat,lon,height) coordinates determined using the northing, easting and elevation local coordinate system that relies in part on projection of a location onto the cylindrical surface $\sigma 0$. The transformation T2 is also required to provide a "best fit" mapping of fiducial survey locations onto themselves, by minimizing an error $\epsilon 2$ defined by $$\varepsilon 2 = \sum_{k=1}^{K} w'_k \{(X'k - T2(x'k))^2 + (Y'k - T2(y'k))^2 + (Z'k - T2(z'k))^2\}, \quad (38)$$

The weighting coefficients $w'_k$ used in optimizing the transformation T2 need not be the same as the weighting coefficients $w_k$ used in optimizing the transformation T1. The n2 parameters that define the transformation T2 are chosen to minimize the error $\epsilon 2$ in the same manner that the n1 parameters that define the transformation T1 are chosen to minimize the error $\epsilon 1$.

Figure 5A:
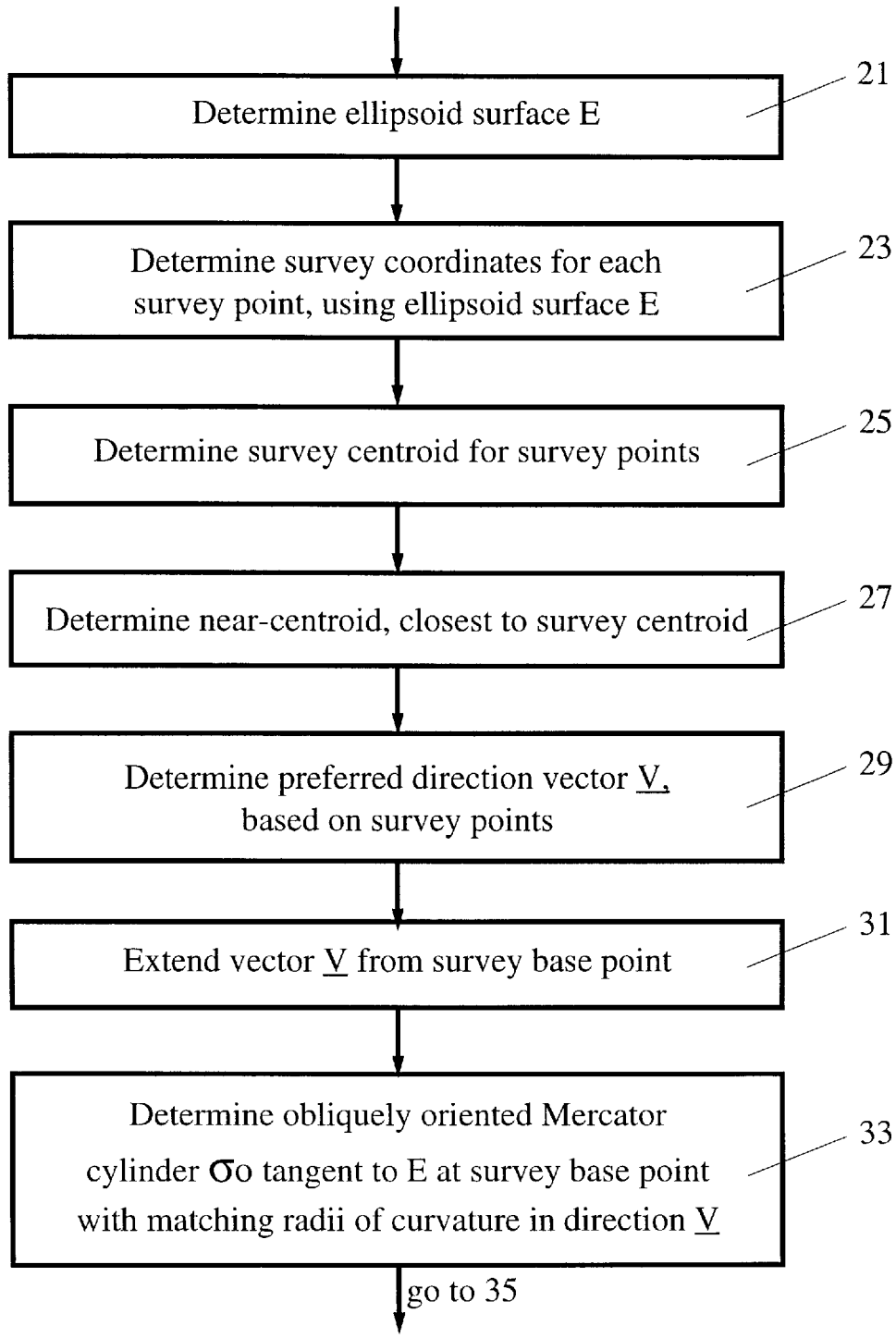
FIGS. 5 and 6 illustrate a procedure and an apparatus suitable for practicing the invention.
Figure 5B:
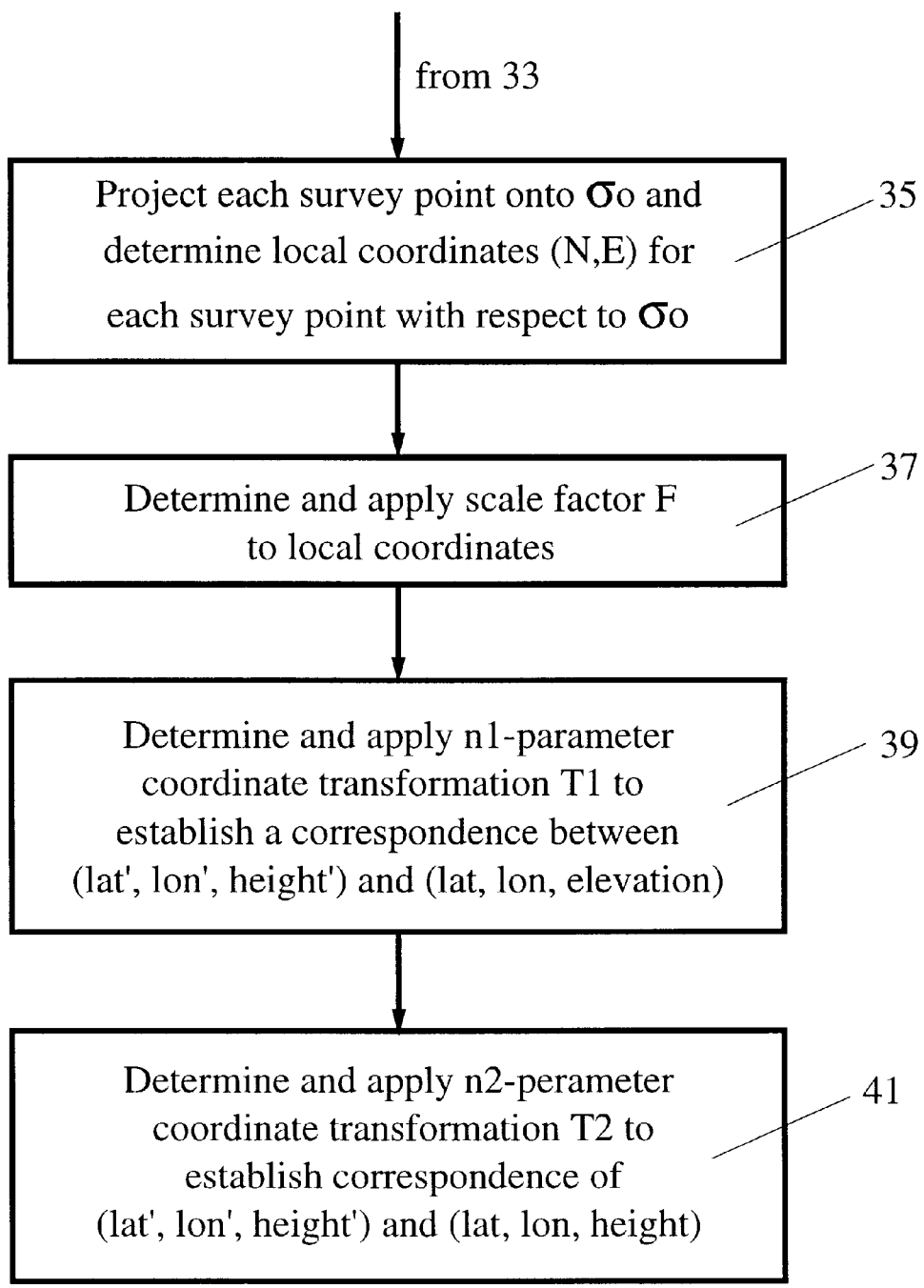

FIG. 5 is a flow chart illustrating one suitable procedure for practicing the invention. In step 21, an appropriate ellipsoid surface E is identified. In step 23, survey coordinates for each survey point used in the present survey are determined, relative to the surface E. In step 25, a centroid $(x\hat{},y\hat{},z\hat{})$ for the collection of survey points is determined. In a general situation, the coordinates $(x\hat{},y\hat{},z\hat{})$ will not coincide with the coordinates of any survey location. In step 27, the location coordinates (x0,y0,z0) of the survey point that are closest to the centroid coordinates are determined, and the coordinates (x0,y0,z0) for this nearest survey point (a "near-centroid") are used for the survey base point.

In step 29, a preferred direction vector V is determined, using the survey points. The vector V might be the vector extending from a first survey point to a second survey point, where the distance between the first and second survey points is the maximum distance between any two points in the collection of survey points. The preferred direction vector V may be defined in other ways as well. In step 31, the vector V is translated to the survey base point (x0,y0,z0) and is extended from the survey base point to define a direction, with direction coordinates $(v_x,v_y,v_z)$ from that point. The translated vector V is projected onto a horizontal plane H (z=constant) that passes through the survey base point, to determine a direction in this horizontal plane for which the curvature C(E) of the ellipsoid surface is to be calculated at the survey base point P0.

In step 33, an obliquely oriented Mercator cylindrical $\sigma 0$ is constructed that satisfies the following conditions: (1) the cylinder defined by $\sigma 0$ has a cylinder axis that is perpendicular to the direction of the vector V; (2) the cylindrical surface $\sigma 0$ is tangent to the surface E at the survey base point; (3) the curvature $C(\sigma 0)$ of the cylindrical surface s0, computed in a direction with direction coordinates $(v_x,v_y)$ in the horizontal plane H, is equal to the curvature C(E) for the ellipsoid, computed for this direction. This construction allows the curved surface of the cylindrical surface $\sigma 0$ in the preferred direction (vector V) to approximate the curved surface of the ellipsoid E in the preferred direction.

In step 35, each survey point Pi (i=1, 2, . . . , M) is projected, preferably perpendicularly or approximately so, onto the surface $\sigma 0$ to determine a projected survey point $\pi(Pi)$ having local northing and easting coordinates (Ni,Ei) on the surface $\sigma 0$ and having a local elevation coordinate ELi of the survey point with respect to the surface $\sigma 0$. The distance $d(\pi(Pi),\pi(Pj))$ of two projected survey points is, in general, not the same as the distance d(Pi,Pj) for the survey points Pi and Pj themselves. In step 37, a scale factor F is determined that approximately preserves the distance d(Pi, Pj) under the projection onto the surface $\sigma 0$, using one of the methods discussed in the foregoing or using some other suitable method. The scale factor can be applied to the radius of the cylindrical surface $\sigma 0$, or to coordinates measured in a particular direction on or in the surface $\sigma 0$, to approximately preserve the distance d(Pi,Pj) under the projection of survey points onto the surface $\sigma 0$.

In many surveys, two or more fiducial survey points are prescribed, whose location coordinates are accurately known and are to be preserved as closely as possible in the survey. In step 39, an n1-parameter coordinate transformation T1 is determined and applied to provide a correspondence between the height coordinate H and the elevation coordinate EL, where this transformation is required to provide a "best fit" for each of the fiducial survey points and their fiducial location coordinates. In step 41, an n2-parameter coordinate transformation T2 is determined and applied to further optimize a correspondence between the coordinates (lat',lon',height') in the original or global coordinate system and coordinates (lat,lon,height) in a local coordinate system, where the transformation T2 is required to provide a "best fit" for each of the fiducial survey points and their images under T2. Step 39 and step 41 are individually optional but are preferably included to provide the indicated correspondences and to preserve as closely as possible any fiducial survey locations under these transformations.

Figure 6:
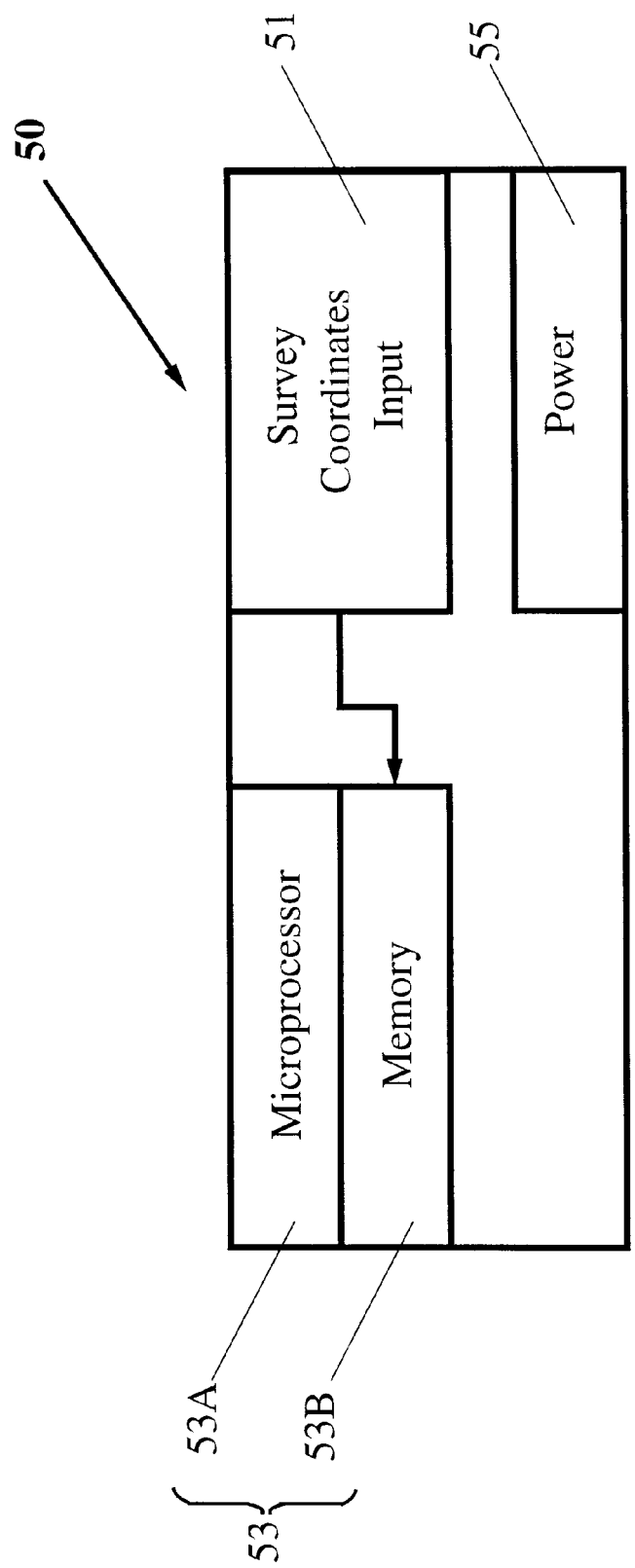

FIG. 6 illustrates apparatus 50 that can be used to practice the invention. Fiducial survey coordinates (if included) and survey coordinates for points in the present survey are entered, using a survey coordinates input module or interface 51. These survey coordinates are stored in a memory unit 53B that is part of a computer 53. The computer 53 also includes a microprocessor 53A that is programmed to perform the calculations discussed above for determination of the ellipsoid surface E, coordinates for a survey base point, a preferred direction vector V, a cylindrical surface σ0, a projection π(Pi) of a survey point Pi onto the surface σ0, local coordinates (Ni,Ei,ELi) for a survey point Pi with respect to the surface σ0, a scale factor F and/or an n-parameter coordinate transformation T. A power module 55 provides electrical power for one or more of the survey coordinates input module 51 and the computer 53. The apparatus 50 is preferably portable and performs the calculations indicated above in the filed, approximately at the time the survey is being conducted. However, the apparatus 50 can become part of a post-processing system that performs post-processing calculations "back at the office" after the survey is completed.

The approach disclosed here uses a cylindrical surface, rather than a plane, that is tangent to the survey ellipsoid at a chosen survey base point and that has approximately the same curvature as the survey ellipsoid in a preferred direction. This reduces the error associated with the survey location coordinates, determined with reference to the cylindrical surface, by reducing the distance between a survey location and the (cylindrical) surface used to determine the local survey coordinates.

What is claimed is:

1. A method for providing a two-dimensional representation of a collection of survey points, the method comprising the steps of:

determining a survey ellipsoid, and determining survey location coordinates of each of a plurality of survey locations with reference to the ellipsoid;

determining a survey base point on the ellipsoid surface;

determining a preferred direction at the survey base point;

determining a cylinder that is positioned and orientated so that (1) the cylinder axis is perpendicular to the preferred direction, (2) the cylindrical surface is approximately tangent to the ellipsoid surface at the survey base point' and (3) the curvature of the ellipsoid surface and the curvature of the cylindrical surface, both computed in a direction parallel to the preferred direction at the survey base point, are approximately equal;

projecting at least one survey location onto the cylindrical surface to produce a projected survey location having at least first and second projected local survey coordinates;

determining a scale factor with reference to the ratio of distance between selected first and second selected survey locations divided by distance between said projected survey locations for the selected first and second survey locations; and applying the scale factor to coordinate values for said projected survey locations for at least one selected direction lying in said cylindrical surface.

2. The method of claim 1, further comprising the step of applying said scale factor to said coordinate values for said survey locations for each of two independent directions lying in said cylindrical surface.

3. The method of claim 1, wherein said step of determining said preferred direction at said survey base point comprises the steps of:

determining first and second survey locations whose distance of separation is at least as large as the distance of separation between any two of said survey locations; and determining said preferred direction as the direction of a vector that extends from said first survey location to said second survey location.

4. The method of claim 1, wherein said step of determining said survey base point comprises the steps of:

determining a survey centroid location whose location coordinates are the averages of each of the coordinate values for said plurality of survey locations; and selecting as said survey base point a survey location that is closest to the survey centroid location.

5. The method of claim 1, further comprising the step of determining a third local coordinate, that corresponds to and is measured in a direction perpendicular to at least one of said first and second projected local survey coordinates for said at least one survey location.

6. The method of claim 5, further comprising the step of determining a transformation from a first coordinate system, determined with reference to said survey ellipsoid, onto a second coordinate system that includes said first and second projected local survey coordinates and said third local coordinate, where the transformation provides a least-squares-based best fit for the location coordinates for a plurality of fiducial survey locations whose coordinates are known in said first coordinate system.

7. An apparatus for providing a two-dimensional representation of a collection of survey points, the apparatus comprising:

a survey coordinate input module to receive survey coordinates for a plurality of survey locations that are determined with reference to a survey ellipsoid; and a computer, including a memory to receive and store survey coordinates from the survey coordinate input module, and containing parameters describing the survey ellipsoid, where the computer is programmed:

to determine a survey base point on the ellipsoid surface;

to determine a preferred direction at the survey base point;

to determine a cylinder that is positioned and orientated so that (1) the cylinder axis is perpendicular to the preferred direction, (2) the cylindrical surface is approximately tangent to the ellipsoid surface at the survey base point, and (3) the curvature of the ellipsoid surface and the curvature of the cylindrical surface, both computed in a direction parallel to the preferred direction at the survey base point, are approximately equal;

to project at least one survey location onto the cylindrical surface to produce a projected survey location having at least first and second projected local survey coordinates;

to determine a scale factor with reference to the ratio of distance between selected first and second selected survey locations divided by distance between said projected survey locations for the selected first and second survey locations; and to apply the scale factor to coordinate values for said projected survey locations for at least one selected direction lying in said cylindrical surface.

8. The apparatus of claim 7, wherein said computer is further programmed to apply said scale factor to said coordinate values for said survey locations for each of two independent directions lying in said cylindrical surface.

9. The apparatus of claim 7, wherein said computer is programmed to determine said preferred direction at said survey base point by:

determining first and second survey locations whose distance of separation is at least as large as the distance of separation between any two of said survey locations; and determining said preferred direction as the direction of a vector that extends from said first survey location to said second survey location.

10. The apparatus of claim 7, wherein said computer is programmed to determine said survey base point by:
  determining a survey centroid location whose location coordinates are the averages of each of the coordinate values for said plurality of survey locations; and
  selecting as said survey base point a survey location that is closest to the survey centroid location.

11. The apparatus of claim 7, wherein said computer is programmed to determine a third local coordinate that corresponds to and is measured in a direction perpendicular to at least one of said first and second projected local survey coordinates for said at least one survey location.

12. The apparatus of claim 7, wherein said computer memory also stores known location coordinates for a plurality of fiducial survey locations, and wherein said computer is further programmed to determine a transformation from a first coordinate system, determined with reference to said survey ellipsoid, onto a second coordinate system that includes said first and second projected local survey coordinates and said third local coordinate, where the transformation provides a least-squares-based best fit for the location coordinates for a plurality of fiducial survey locations whose coordinates are known in said first coordinate system.

13. A method for providing a two-dimensional representation of a collection of survey points, the method comprising the steps of:
  determining a survey ellipsoid, and determining survey location coordinates of each of a plurality of survey locations with reference to the ellipsoid;
  determining a survey base point on the ellipsoid surface;
  determining a preferred direction at the survey base point;
  determining a cylinder that is positioned and orientated so that (1) the cylinder axis is perpendicular to the preferred direction, (2) the cylindrical surface is approximately tangent to the ellipsoid surface at the survey base point' and (3) the curvature of the ellipsoid surface and the curvature of the cylindrical surface, both computed in a direction parallel to the preferred direction at the survey base point, are approximately equal;
  projecting at least one survey location onto the cylindrical surface to produce a projected survey location having at least first and second projected local survey coordinates;
  determining a scale factor with reference to a ratio of a distance between first and second selected survey locations, drawn from a selected set S of M survey locations ($M \geq 2$), divided by a distance between said projected survey locations for the first and second selected survey locations;
  averaging the scale factor over all distinct pairs of said survey locations in the set S to obtain an averaged scale factor; and
  applying the averaged scale factor to coordinate values for said projected survey locations for at least one selected direction lying in said cylindrical surface.

14. An apparatus for providing a two-dimensional representation of a collection of survey points, the apparatus comprising:
  a survey coordinate input module to receive survey coordinates for a plurality of survey locations that are determined with reference to a survey ellipsoid; and
  a computer, including a memory to receive and store survey coordinates from the survey coordinate input module, and containing parameters describing the survey ellipsoid, where the computer is programmed:
    to determine a survey base point on the ellipsoid surface;
    to determine a preferred direction at the survey base point;
    to determine a cylinder that is positioned and orientated so that (1) the cylinder axis is perpendicular to the preferred direction, (2) the cylindrical surface is approximately tangent to the ellipsoid surface at the survey base point, and (3) the curvature of the ellipsoid surface and the curvature of the cylindrical surface, both computed in a direction parallel to the preferred direction at the survey base point, are approximately equal;
    to project at least one survey location onto the cylindrical surface to produce a projected survey location having at least first and second projected local survey coordinates;
    to determine a scale factor with reference to a ratio of a distance between first and second selected survey locations, drawn from a selected set S of M survey locations ($M \geq 2$), divided by a distance between said projected survey locations for the first and second selected survey locations;
    to average the scale factor over all distinct pairs of said survey locations in the set S to obtain an averaged scale factor; and
    to apply the averaged scale factor to coordinate values for said projected survey locations for at least one selected direction lying in said cylindrical surface.

15. A method for providing a two-dimensional representation of a collection of survey points, the method comprising the steps of:
  determining a survey ellipsoid, and determining survey location coordinates of each of a plurality of survey locations with reference to the ellipsoid;
  determining a survey base point on the ellipsoid surface;
  determining a preferred direction at the survey base point;
  determining a cylinder that is positioned and orientated so that (1) the cylinder axis is perpendicular to the preferred direction, (2) the cylindrical surface is approximately tangent to the ellipsoid surface at the survey base point' and (3) the curvature of the ellipsoid surface and the curvature of the cylindrical surface, both computed in a direction parallel to the preferred direction at the survey base point, are approximately equal;
  projecting at least one survey location onto the cylindrical surface to produce a projected survey location having at least first and second projected local survey coordinates;
  determining a scale factor with reference to the ratio of distance between selected first and second selected survey locations divided by distance between said projected survey locations for the selected first and second survey locations, averaged over a selected set of distinct pairs of said survey locations; and
  applying the scale factor to coordinate values for said projected survey locations for at least one selected direction lying in said cylindrical surface.

16. An apparatus for providing a two-dimensional representation of a collection of survey points, the apparatus comprising:
  a survey coordinate input module to receive survey coordinates for a plurality of survey locations that are determined with reference to a survey ellipsoid; and a computer, including a memory to receive and store survey coordinates from the survey coordinate input module, and containing parameters describing the survey ellipsoid, where the computer is programmed:

to determine a survey base point on the ellipsoid surface;

to determine a preferred direction at the survey base point;

to determine a cylinder that is positioned and orientated so that (1) the cylinder axis is perpendicular to the preferred direction, (2) the cylindrical surface is approximately tangent to the ellipsoid surface at the survey base point, and (3) the curvature of the ellipsoid surface and the curvature of the cylindrical surface, both computed in a direction parallel to the preferred direction at the survey base point, are approximately equal;

to project at least one survey location onto the cylindrical surface to produce a projected survey location having at least first and second projected local survey coordinates;

to determine a scale factor with reference to the ratio of distance between selected first and second selected survey locations divided by distance between said projected survey locations for the selected first and second survey locations, averaged over a selected set of distinct pairs of said survey locations; and to apply the scale factor to coordinate values for said projected survey locations for at least one selected direction lying in said cylindrical surface.

* * * * *